(12) United States Patent
Mahler et al.

(10) Patent No.: US 12,040,520 B2
(45) Date of Patent: Jul. 16, 2024

(54) INTEGRATED SOEC BUILDING BLOCK (SBB)

(71) Applicant: Bloom Energy Corporation, San Jose, CA (US)

(72) Inventors: Jessica Mahler, San Jose, CA (US); Chad Pearson, San Jose, CA (US); Rueben M. Kempton, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/348,704

(22) Filed: Jul. 7, 2023

(65) Prior Publication Data

US 2024/0021859 A1 Jan. 18, 2024

Related U.S. Application Data

(60) Provisional application No. 63/359,135, filed on Jul. 7, 2022.

(51) Int. Cl.
| | |
|---|---|
| *H01M 8/249* | (2016.01) |
| *C25B 1/042* | (2021.01) |
| *H01M 8/04089* | (2016.01) |
| *H01M 8/04276* | (2016.01) |
| *H01M 8/0438* | (2016.01) |
| *H01M 8/0656* | (2016.01) |
| *H01M 8/12* | (2016.01) |

(52) U.S. Cl.
CPC ............. *H01M 8/249* (2013.01); *C25B 1/042* (2021.01); *H01M 8/04097* (2013.01); *H01M 8/04276* (2013.01); *H01M 8/0438* (2013.01); *H01M 8/0656* (2013.01); *H01M 2008/1293* (2013.01)

(58) Field of Classification Search
CPC ......... H01M 2008/1293; C25B 15/027; C25B 1/042; C25B 9/70; C25B 15/08
See application file for complete search history.

(56) References Cited

U.S. PATENT DOCUMENTS

| | | | |
|---|---|---|---|
| 7,705,490 B2 | 4/2010 | Srinivasan et al. | |
| 9,190,693 B2 | 11/2015 | Sridhar et al. | |
| 9,755,263 B2 | 9/2017 | Trevisan et al. | |
| 10,651,496 B2 | 5/2020 | Trevisan et al. | |
| 11,862,832 B2 | 1/2024 | Raghavan et al. | |
| 2016/0260996 A1* | 9/2016 | Trevisan | H01M 8/249 |
| 2017/0237095 A1* | 8/2017 | Yokoyama | H01M 8/04955 429/429 |
| 2019/0372137 A1* | 12/2019 | Planque | C25B 9/67 |
| 2023/0037162 A1 | 2/2023 | Raghavan et al. | |
| 2023/0282867 A1 | 9/2023 | Pearson et al. | |

* cited by examiner

*Primary Examiner* — Adam A Arciero
(74) *Attorney, Agent, or Firm* — THE MARBURY LAW GROUP PLLC (57) ABSTRACT

A modular electrolyzer system including a power module and a generator module wherein the power module and the generator module are integrated with a hydrogen collection component and a steam delivery component, the hydrogen collection component and the steam delivery component being disposed on a structural base.

20 Claims, 5 Drawing Sheets

FIG. 5A

INTEGRATED SOEC BUILDING BLOCK (SBB)

PRIORITY INFORMATION

This application claims the benefits of U.S. Provisional Application No. 63/359,135, which was filed on Jul. 7, 2022, the contents of which are hereby incorporated by reference in its entirety.

FIELD

The embodiments of the present invention are generally directed toward electrolyzer systems including solid oxide electrolyzer cells (SOEC) and methods of operating the same, and more particularly toward installing and maintaining the same.

BACKGROUND

Solid oxide fuel cells (SOFC) can be operated as an electrolyzer in order to produce hydrogen and oxygen, referred to as solid oxide electrolyzer cells (SOEC). In SOFC mode, oxygen ions are transported from the cathode side (air) to the anode side (fuel) and the driving force is the chemical gradient of partial pressure of oxygen across the electrolyte. In SOEC mode, a positive potential is applied to the airside of the cell and the oxygen ions are transported from the fuel side to the airside. Since the cathode and anode are reversed between SOFC and SOEC (i.e., SOFC cathode is SOEC anode, and SOFC anode is SOEC cathode), the SOFC cathode (SOEC anode) may be referred to as the air electrode, and the SOFC anode (SOEC cathode) may be referred to as the fuel electrode. During SOEC mode, water in the fuel stream is reduced ($H_2O+2e^-\rightarrow O_2+H_2$) to form $H_2$ gas and $O_{2-}$ ions, $O_{2-}$ ions are transported through the solid electrolyte, and then oxidized on the air side ($O_{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V.

The fuel cell/electrolyzer stacks or columns of the systems are usually located in hot boxes (i.e., thermally insulated containers). The hot boxes of existing large stationary fuel cell/electrolyzer systems are housed in cabinets, housings, or enclosures. The terms cabinet, enclosure, and housing are used interchangeably herein. The cabinets are usually made from metal. The metal is painted with either automotive or industrial powder coat paint, which is susceptible to scratching, denting and corrosion. Most of these cabinets are similar to current industrial HVAC equipment cabinets.

Electrolyzer products are typically built and delivered in shipping containers and custom built e-houses, or electrolyzer plants are built onsite (i.e., at the customer site). Shipping individual modules (e.g., power modules, generator modules, etc.) requires assembly and disassembly of $H_2$ collection components, steam supply components, and power connections at manufacturing FIT, and then reassembly and revalidation onsite.

Rapid and inexpensive installation can help to increase the prevalence of SOFC/SOEC systems. Installation costs for pour in place custom designed concrete pads, which generally require trenching for plumbing and electrical lines, can become cost prohibitive. Installation time also is a problem in the case of most sites since concrete pours and trenches generally require one or more building permits and building inspector reviews. Common system installations include construction techniques, such as use of conduit, hard-piped trenched plumbing with stub-ups, concrete anchors for seismic tie-down, and the like.

SUMMARY

Accordingly, the embodiments of the present invention are directed to a modular electrolyzer system that substantially obviates one or more problems due to limitations and disadvantages of the related art.

An object of the present invention is to provide an electrolyzer modular block site kits for rapid deployment.

Another object of the present invention is to provide a large site stamp architecture.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the modular electrolyzer system includes a power module and a generator module wherein the power module and the generator module are integrated with a hydrogen collection component and a steam delivery component, the hydrogen collection component and the steam delivery component being disposed on a structural base.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the embodiments of the present invention, examples of which are illustrated in the accompanying drawings. It is to be understood that both the foregoing general description and the following detailed description are examples, and are not restrictive of the invention as claimed.

Figure 1:
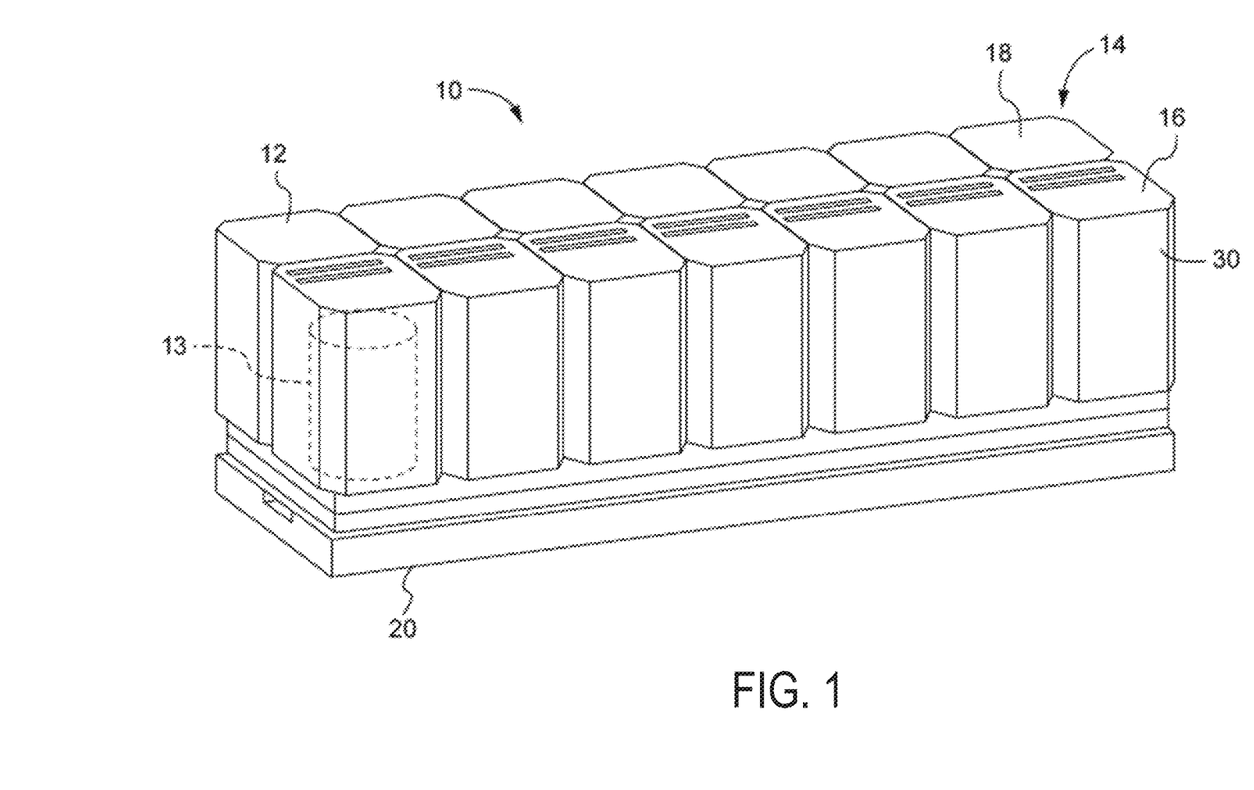
FIG. 1 illustrates a SOFC/SOEC modular system according to an example embodiment of the present invention.

FIG. 1 illustrates a SOFC/SOEC modular system 10 according to an example embodiment of the present invention.

The SOFC/SOEC modular system 10 includes a housing 14 in which at least one of generator modules 12 (preferably a plurality, generator module 12 also referred to as "SGM"), one or more fuel processing modules 16, and one or more power conditioning modules 18 (i.e., electrical output, also referred to as a power module or "SPM") are disposed. In the embodiments, the power conditioning modules 18 are configured to deliver direct current (DC). In alternative embodiments, the power conditioning modules 18 are configured to deliver alternating current (AC). In these example embodiments, the power conditioning modules 18 may include a mechanism to convert DC to AC, such as an inverter. For example, the system 10 may include any desired number of modules, such as 2-30 generator modules, 3-12 generator modules, 6-12 generator modules, or other large site configuration of generator modules.

The example system 10 of FIG. 1 includes six generator modules 12 (one row of six modules stacked side to side), one fuel processing module 16, and one power conditioning module 18 on a pad 20. The housing 14 may include a cabinet to house each module 12, 16, 18. Alternatively, modules 16 and 18 may be disposed in a single cabinet. While one row of generator modules 12 is shown, the system may include more than one row of modules 12. For example, the SOFC/SOEC system 10 may include two rows of generator modules 12 arranged back-to-back/end-to-end.

Each generator module 12 is configured to house one or more hot boxes 13. Each hot box contains one or more stacks or columns of fuel/eelectrolyzer cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. also may be used.

In SOFC systems, the modular fuel cell system 10 also contains at least one fuel processing module 16. The fuel processing module 16 includes components for pre-processing of fuel, such as adsorption beds (e.g., desulfurizer and/or other impurity adsorption) beds. The fuel processing module 16 may be designed to process a particular type of fuel. For example, the system may include a diesel fuel-processing module, a natural gas fuel-processing module, and an ethanol fuel-processing module, which may be provided in the same or in separate cabinets. A different bed composition tailored for a particular fuel may be provided in each module. The fuel processing module(s) 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, the fuel processing module 16 may include a reformer 17. Alternatively, if it is desirable to thermally integrate the reformer 17 with the fuel/electrolyzer cell stack(s), then a separate reformer 17 may be located in each hot box 13 in a respective generator module 12. Furthermore, if internally reforming fuel/electrolyzer cells are used, then an external reformer 17 may be omitted entirely.

Also in SOFC systems, the power-conditioning module 18 includes components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power-conditioning module 18 may be designed to convert DC power from the fuel cell modules to different AC voltages and frequencies. Configurations for 208V, 60 Hz; 480V, 60 Hz; 415V, 50 Hz; and other common voltages and frequencies can be utilized.

The fuel-processing module 16 and the power-conditioning module 18 may be housed in one cabinet of the housing 14. If a single input/output cabinet is provided, then modules 16 and 18 may be located vertically (e.g., power conditioning module 18 components above the fuel processing module 16 desulfurizer canisters/beds) or side by side in the cabinet.

As shown in the example embodiment in FIG. 1, one cabinet 14 is provided for one row of six generator modules 12, which are arranged linearly side to side on one side of the input/output module 14. The row of modules may be positioned, for example, adjacent to a building for which the system provides power (e.g., with the backs of the cabinets of the modules facing the building wall).

The linear array of generator modules 12 is readily scaled. For example, more or fewer generator modules 12 may be provided depending on the power needs of the building or other facility serviced by the fuel cell system 10. The generator modules 12 and input/output modules 14 may also be provided in other ratios. For example, in other exemplary embodiments, more or fewer generator modules 12 may be provided adjacent to the input/output module 14. Further, the support functions can be served by more than one input/output module 14 (e.g., with a separate fuel processing module 16 and power conditioning module 18 cabinets). Additionally, the input/output module 14 is at the end of the row of generator modules 12, it also can be located in the center of a row generator modules 12 or other location.

The SOFC/SOEC modular system 10 may be configured in a way to ease servicing of the components of the system 10. For example, the routinely or high serviced components (such as the consumable components) may be placed in a single module to reduce amount of time required for the service person. For example, a purge gas (optional) and desulfurizer material for a natural gas fueled system may be placed in a single module (e.g., a fuel-processing module 16 or a combined input/output module 14 cabinet). This can be the only module cabinet accessed during routine maintenance. Thus, each module 12, 14, 16, and 18 can be serviced, repaired or removed from the system without opening the other module cabinets and without servicing, repairing or removing the other modules. In addition, plumbing and electrical components may be disposed above a steel overlay disposed between the concrete pad and the generator modules 12.

In the example configuration described above, the system 10 can include multiple generator modules 12. When at least one generator module 12 is taken off line (i.e., no power is generated by the stacks in the hot box 13 in the off line module 12), the remaining generator modules 12, the fuel processing module 16 and the power conditioning module 18 (or the combined input/output module 14) are not taken off line. Furthermore, the fuel cell system 10 may contain more than one of each type of module 12, 14, 16, or 18.

When at least one module of a particular type is taken off line, the remaining modules of the same type are not taken off line.

Thus, in a system comprising a plurality of modules, each of the modules 12, 14, 16, or 18 may be electrically disconnected, removed from the fuel/electrolzer cell modular system 10 and/or serviced or repaired without stopping an operation of the other modules in the system, allowing the fuel cell system to continue to generate electricity. The entire SOFC/SOEC modular system 10 does not have to be shut down if one stack of fuel cells in one hot box 13 malfunctions or is taken off line for servicing.

The modular system 10 may contain additional modules and components, such as those described in U.S. Pat. No. 9,190,693, filed on Jan. 22, 2007, U.S. Pat. No. 9,755,263, filed on Mar. 13, 2014, and U.S. Pat. No. 10,651,496, filed on Mar. 4, 2016, each of which is incorporated herein by reference in its entirety.

Accordingly, the modular design of the SOFC/SOEC system 10 provides flexible system installation and operation. By contrast to prior modular systems, the embodiments use above ground routing for plumbing and electrical outing to increase the speed of installation and maintenance, and to reduce cost. In addition, the need of special tradespeople for installation is reduced. Modules allow scaling of installed generating capacity, reliable generation of power, flexibility of fuel processing, and flexibility of power output voltages and frequencies with a single design set. The modular design results in an "always on" unit with very high availability and reliability, and also provides an improved means of maintenance and scale-up. The modular design also enables the use of available fuels and required voltages and frequencies that may vary by customer and/or by geographic region.

Figure 2:
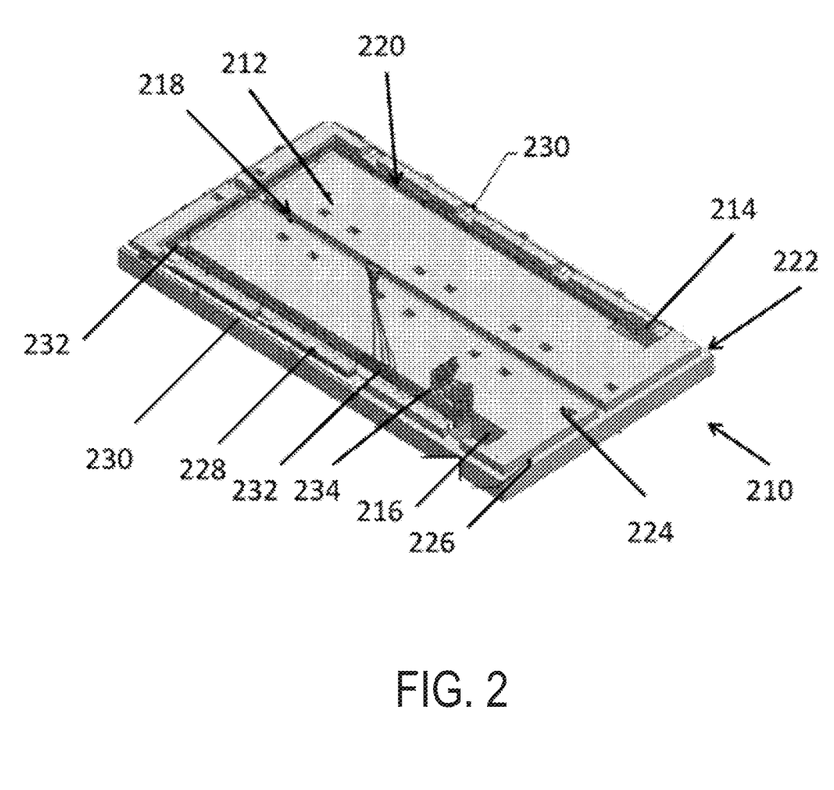
FIG. 2 illustrates a schematic top view of the pad according to an example embodiment of the present invention.

FIG. 2 illustrates a schematic top view of the pad 210 according to an example embodiment of the present invention.

Referring to FIG. 2, the pad 210 includes a base 212. The base 212 may be formed of a concrete or similar material. Alternatively, the base 212 may be made of any other suitable structural material, such as steel or another metal, and may be pre-cast as a single body or may be cast in sections. The base 212 may be made by casting the base material in a patterned mold, removing the cast base 212 from the mold, and then transporting the base 212 from the location of the mold (e.g., in a base fabrication facility) to the operation site of the fuel cell system (i.e., where the fuel cell system will be located to generate power). The base 212 may be configured as a single piece, or may include multiple connected sections.

The base 212 may include first and second through holes 214, 216, a drainage recess 218, a wiring recess 220, and a plumbing recess 222. The base 212 may also include tie-down pockets 224, tie-down inserts 226, and plumbing brackets 228.

In an example configuration, the drainage recess 218 may extend along the middle of the base 212, between the rows of modules, and may be configured to collect, for example, rain or debris collected on the base 212. The tie-down pockets 224 and tie-down inserts 226 may be configured to secure corresponding modules to the base 212. The plumbing recess 222 may extend around the perimeter of the base 212. In particular, the plumbing recess 222 may be formed along the perimeter of base 212 (e.g., or along three or more edges of the base 212). The wiring recess 220 may extend from the first through hole 214 to the second through hole 216, and may be generally U-shaped.

The pad 210 also can include plumbing 230, wiring 232, and a system electrical connection, such as a bus bar 234. In particular, the wiring 232 may be disposed in the wiring recess 220 and may be connected to one or more of the modules. For example, the wiring 232 may be connected to the bus bar 234 and each of the generator modules 12. The bus bar 234 may be connected to the power-conditioning module 18. The power conditioning module 18 may be connected to an external load through the second through hole 216. The bus bar 234 may be disposed on an edge of the through hole 216, such that the wiring 232 does not extend across the through hole 216. However, the bus bar 234 may be disposed on an opposing side of the through hole 216, such that the wiring 232 does extend across the through hole 216, if such a location is needed to satisfy system requirements.

The plumbing 230 may be disposed in the plumbing recess 222. The plumbing 230 may be connected to an external source of water and/or fuel, via the first through hole 214, and may be attached to the plumbing brackets 228. In particular, the plumbing 230 may include a fuel pipe 230A connecting the fuel processing module 16 to the generator modules 12. The plumbing 230 also may include a water pipe 230B configured to provide water to the generator modules 12. The plumbing 230 may extend between the plumbing brackets 228 to the generator modules 12.

In order to quickly and securely connect individual modules of the modular system to one another, the embodiments utilize above ground routing that can be installed quickly and without highly specialized tradespeople. For example, the embodiments of the present invention utilize site kits for modular blocks (or "Building Blocks" including generator modules, power modules, etc.).

According to the various embodiments, the electrolyzer system architecture is a modular approach to system construction, including various functions of the overall system into discrete modules. Each module is manufactured and installed as a separate module, but then can be connected to one another at a customer site. In an alternate embodiment, each modular block (e.g., power module or generator module) is preconfigured onto a skid and installed at the modular block level rather than at a modular level.

Additionally, the embodiments of the invention extend the usage of the SOEC modular block to include the hydrogen collection and steam delivery required for the operation of the electrolyzer. In the various embodiments, the SOEC modules (e.g., power modules and generator modules) are integrated with the $H_2$ collection and steam delivery components on a structural base (e.g., using plumbing and wiring components of base 212). Each of the $H_2$ collection component and the steam delivery component is a system having a combination of piping, valves, and monitoring (e.g., pressure, temperature, flow, etc.). In addition, the functionality of the SOEC modules can be fully tested as an integrated process skid product before being deployed to a customer.

$H_2$ product collection and steam supply are critical to the function of the SOEC modular blocks, and used in both manufacturing FIT and field operation. $H_2$ product collection and steam supply protect against backpressure and overpressure of the stacks for successful operation and long lifetime of the electrolyzer stacks. Additionally, every power module is tested at full power, and full power test infrastructure is expensive. Accordingly, it is preferable to test generator modules.

In various configurations, electrolyzer generator modules utilize additional piping, instrumentation, and components for $H_2$ collection and supply delivery. The additional piping, instrumentation, and components is beyond what is typically considered an energy server site install kit. For example, electrical I/O points (e.g., up to 6) and mechanical flanged connections (e.g., 2) for power modules, and generator heater and power connections are more numerous than the typical energy servers.

Figure 3:
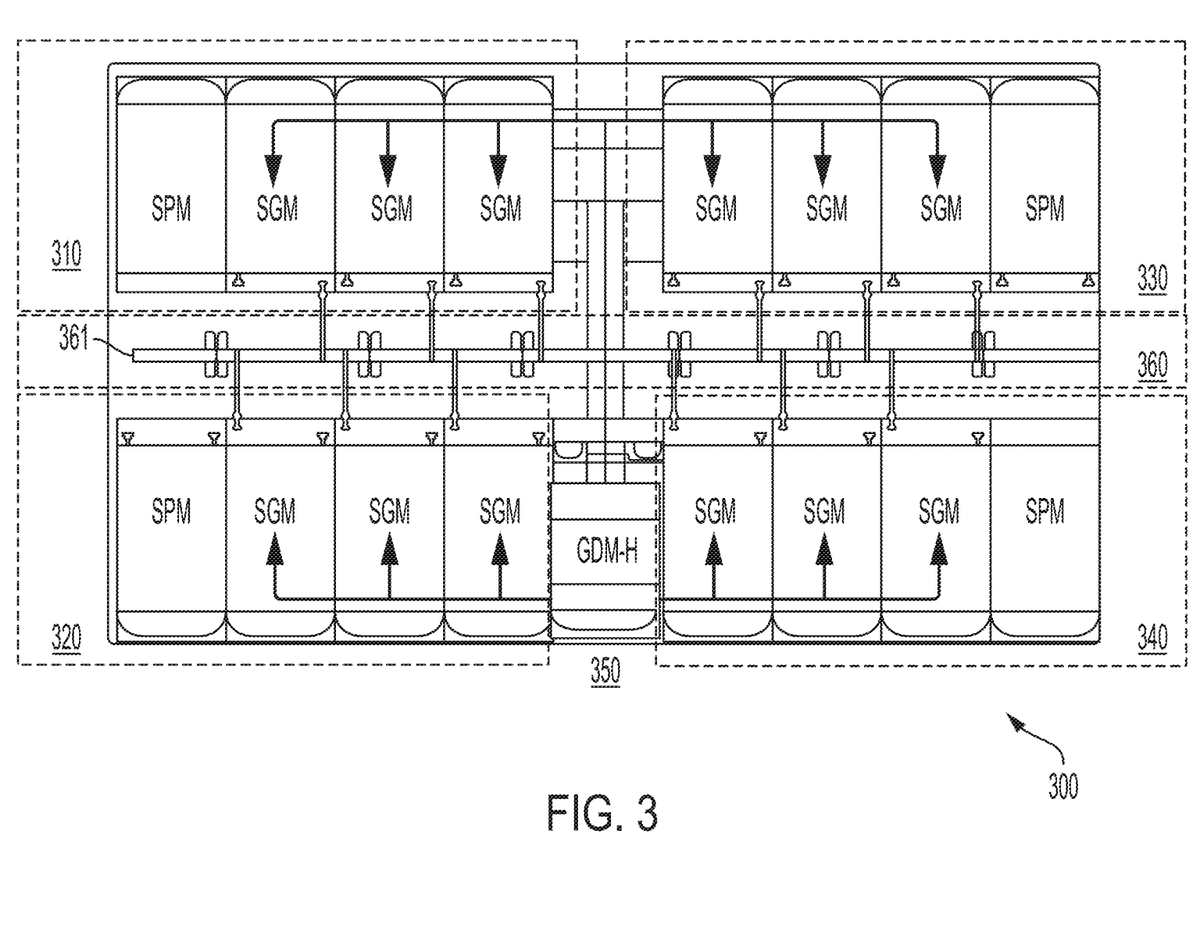
FIG. 3 illustrates a large site electrolyzer system according to an example embodiment of the present invention.

FIG. 3 illustrates a large site electrolyzer system 300 according to an example embodiment of the present invention.

The large-site electrolyzer system 300 includes a gas distribution module ("GDM") 350 that is configured to supply a plurality of modular blocks 310, 320, 330, 340 with startup hydrogen. SOEC and SOFC systems generally require fresh hydrogen gas for startup and shutdown. Gas distribution module 350 can further include a hydrogen outlet, a pressure detector, a gas safety shutoff, and a purge gas distributor.

As discussed above, each modular block incudes one power module ("SPM") and one or more generator modules ("SGM"), for example. A grouping of modular blocks into a collection of systems is referred to as a stamp. Thus, large site electrolyzer system 300 is a stamp. Because hydrogen is a flammable gas that is supplied to each SGM at pressure, a safe method of shutting off gas to a group of generator modules SGMs is needed if a safety event is detected. Thus, GDM 350 is configured to shut off hydrogen supplied to SGMs in the event that a safety event is detected. Safety designs, such as pressure detection, overpressure protection, and gas safety shutoff are readily applied within electrolyzer system 300 by GDM 350 and/or the fuel processing module (e.g., 16). In addition, a stamp level controller can be provided at GDM 350.

Although the grouping of four modular blocks 310, 320, 330, 340 is an example configuration, this configuration is an efficient grouping for gas safety. In addition, the grouping of four modular blocks 310, 320, 330, 340 is efficient for the collection of hydrogen product within servicing aisle 360. The piping 361 within servicing aisle 360 is configured to collect hydrogen product for integration with a downstream compression system. Piping 361 is configured to prevent condensate backflow into the generator modules SGMs. Condensate management also enables using various monitoring and control devices as well as piping to return to the water outlet (or BOP1 of FIG. 4).

Although the grouping of four modular blocks 310, 320, 330, 340 as a stamp is shown, other numbers of modular blocks can form a stamp. Plumbing and electrical connections can be internal to respective modular blocks (or stamps) and/or integrated between modular blocks. Additionally, or alternatively, respective modular blocks 310, 320, 330, 340 may be configured to have external plumbing and electrical connections. Additionally, or alternatively, the location of GDM 350 can be varied relative to modular blocks 310, 320, 330, 340. For example, GDM 350 can be located between respective modular blocks or at a peripheral location (not shown).

Figure 4:
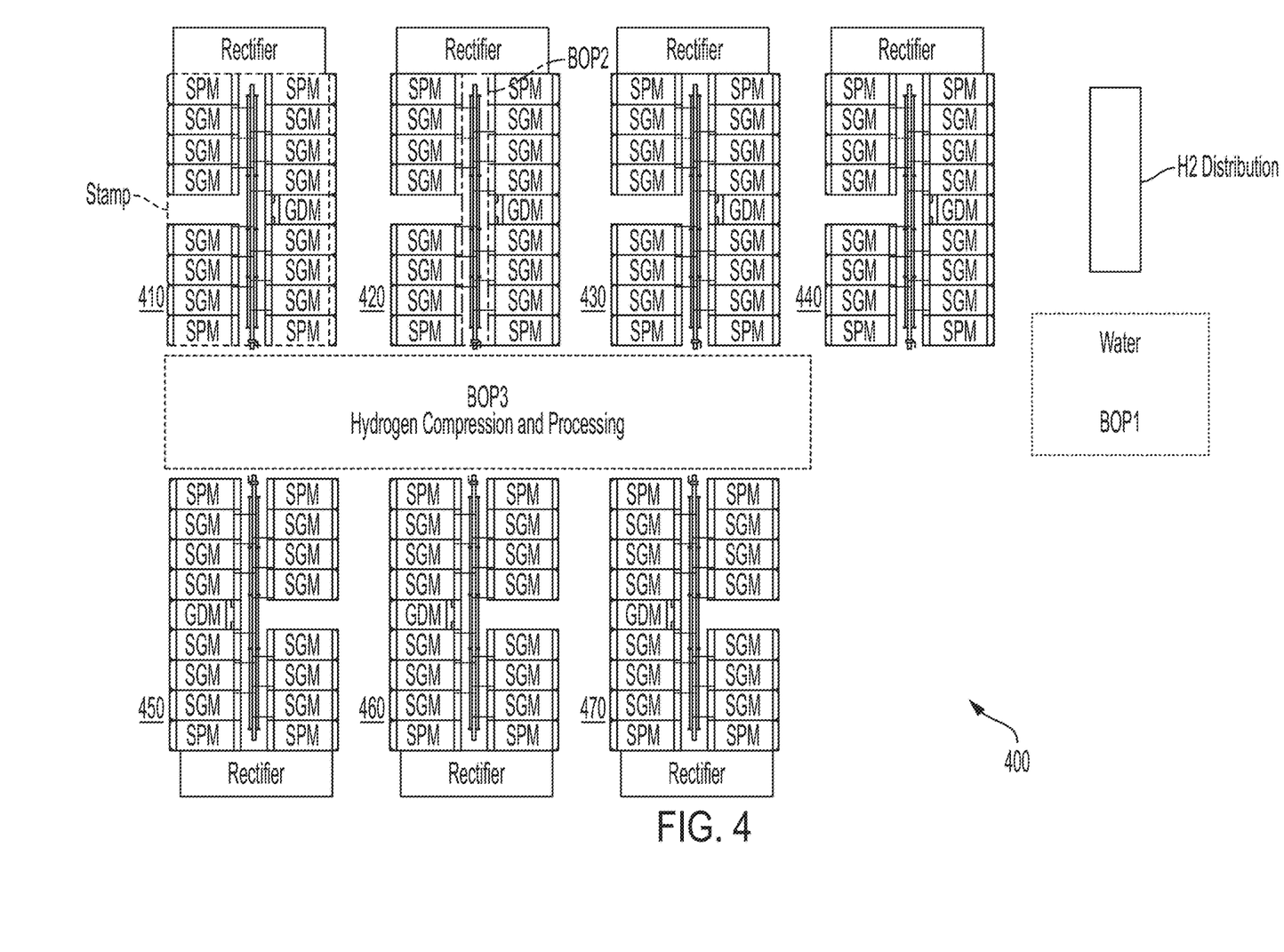
FIG. 4 illustrates a large site electrolyzer system according to another example embodiment of the present invention.

FIG. 4 illustrates a large site (e.g., a 10-megawatt system) electrolyzer system 400 according to an example embodiment of the present invention. As illustrated in FIG. 4, electrolyzer system 400 includes a plurality of stamps 410, 420, 430, 440, 450, 460, and 470. In addition, electrolyzer system 400 further includes additional balance of plant components, such as water source BOP1, hydrogen product collectors BOP2 (e.g., including piping 361), and hydrogen compression and processing BOP3. Hydrogen compression and processing BOP3 is functionally configured to supply hydrogen at pressure to the gas distribution module (e.g., GDM 350) of each respective stamp 410, 420, 430, 440, 450, 460, and 470. Thus, the stamp architecture can be repeated in a large site layout, using the repeated elements to build up to a large site installation.

In the various embodiments, generator modules, power modules, site kits, steam supply BOP (e.g., BOP1) and hydrogen collection BOP (e.g., BOP3) are assembled onto a SOEC modular block process skid at the manufacturing plant prior to FIT. FIT is then completed as integrated SOEC modular building blocks and then shipped to the customer site, with all mechanical and electrical connections validated to meet all functional intent. Integrated SOEC modular blocks are mechanically and electrically connected to create a stamp onsite (e.g., at customer site). Electrical connections to the SOEC modular blocks can be via above ground junction box, coupled ground cable trays, overhead conduit raceways, or via trenched connections.

One example embodiment of the SOEC modular blocks is 1 skid per the combined modules, $H_2$ collection, and steam supply. Another example embodiment is 1 skid for modules, and 1 skid for a shared set of $H_2$ collection and steam supply. Installing the modules on process skids enables a combination of both the modular approach of design and manufacturing with the benefits of fully integrating critical balance of plant before leaving the factory.

Figure 5A:
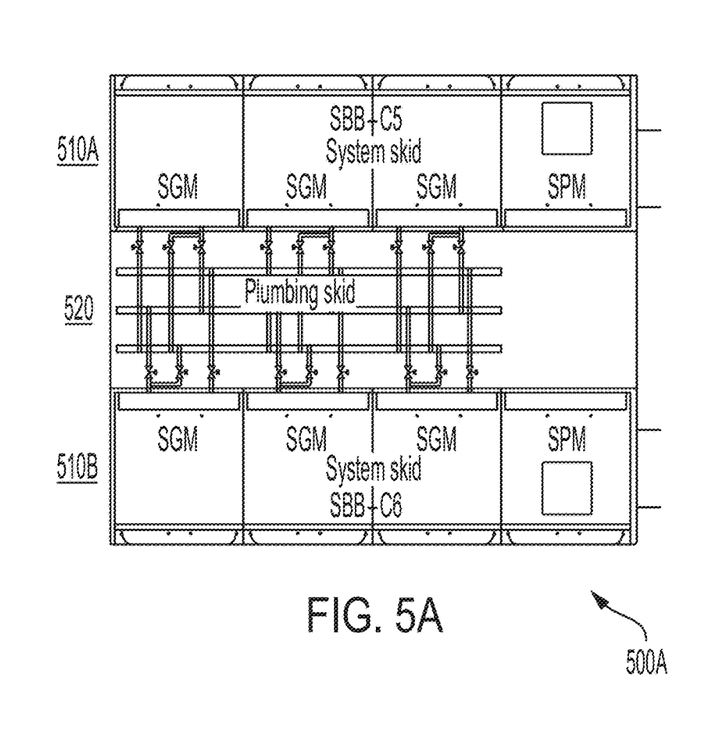
FIG. 5A illustrates a top view of system and plumbing/electrical skids according to an example embodiment of the present invention.

FIG. 5A illustrates a top view 500A of system skids 510A, 510B and utility skid 520 according to an example embodiment of the present invention. As illustrated in FIG. 5A, a combination of system skids 510A, 510B including power modules and generator modules are functionally coupled to utility skid 520. Utility skid 520 includes the various plumbing and electrical components to support functionality of system skids 510A, 510B. Here, the structural base (e.g., 210) includes one or more system skids (e.g., 510A, 510B) configured to support at least the power module and the generator module. The structural base further comprises a utility skid configured to provide plumbing and electrical components for the respective system skids.

Figure 5B:
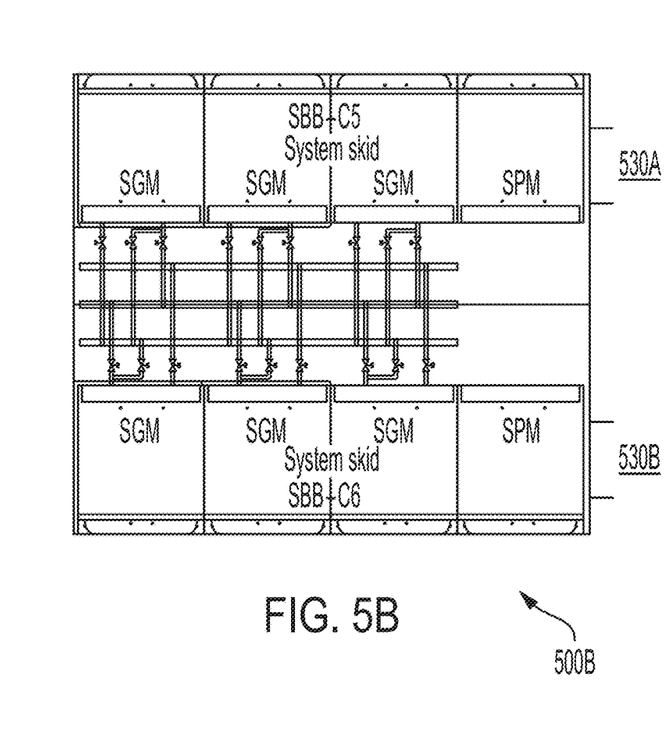
FIG. 5B illustrates a top view of integrated system and plumbing/electrical skids according to another example embodiment of the present invention.

Alternatively, FIG. 5B illustrates a top view 500B of an integrated system skid and utility skid 530A, 530B according to another example embodiment of the present invention. Each of integrated system skid and utility skid 530A, 530B includes power modules and generator modules that are functionally coupled to plumbing/electrical components. Here, the structural base (e.g., 210) includes a plurality of system skids, each of the system skids configured to support at least the power module and the generator module. Each of the system skids further includes plumbing and electrical components for the power module and the generator module.

Accordingly, safe integration of high voltage power electronics in the same enclosure as fuel generating/consuming element (i.e., the electrolyzer) is achieved. The embodiments enable modular install of the enclosure at a site level. Further, the enclosure is compatible with internal steam or external steam. In addition, the embodiments enable access and connection points for hydrogen out and the optional steam inlet (e.g., external steam) within the modular footprint.

By utilizing the various embodiments of the invention, the connection configurations facilitate a repeatable method and location of connecting several hydrogen generation modules to shared hydrogen collection and shared supply steam. The connection configurations enable a common service aisle and space for hydrogen collection/steam supply behind a back-to-back or linear configuration of hydrogen generation modules. This enables the site design to easily be scaled with more or fewer hydrogen generation modules.

It will be apparent to those skilled in the art that various modifications and variations can be made in the modular electrolyzer system of the present invention without departing from the spirit or scope of the invention. Thus, it is intended that the present invention cover the modifications and variations of this invention provided they come within the scope of the appended claims and their equivalents.

What is claimed is:

1. A modular electrolyzer system, comprising:
a block comprising a row of modules comprising a power module and a plurality of generator modules disposed on a structural base;
a hydrogen collection component and a steam delivery component integrated with the power module and at least one generator module, the hydrogen collection component and the steam delivery component being disposed on the structural base, the hydrogen collection component extending from the plurality of generator modules into a servicing aisle located on one side of the row of modules.

2. The modular electrolyzer system of claim 1, wherein functionality of the power module is tested and confirmed as an integrated skid product before being deployed to a customer site.

3. The modular electrolyzer system of claim 1, wherein functionality of the plurality of generator modules is tested and confirmed as an integrated skid product before being deployed to a customer site.

4. The modular electrolyzer system of claim 1, wherein the structural base comprises a system skid configured to support at least the power module and the plurality of generator modules.

5. The modular electrolyzer system of claim 4, wherein the structural base further comprises a utility skid configured to provide plumbing and electrical components for the system skid.

6. The modular electrolyzer system of claim 1, wherein the structural base comprises a plurality of system skids, each of the system skids configured to support at least a power module and a plurality of generator modules.

7. The modular electrolyzer system of claim 6, wherein each of the system skids further comprises plumbing and electrical components for the power module and the plurality of generator modules.

8. The modular electrolyzer system of claim 1, further comprising:
a gas distribution module configured to supply hydrogen to the plurality of generator modules.

9. The modular electrolyzer system of claim 8, wherein the system comprises a plurality of blocks, wherein the gas distribution module is disposed between adjacent blocks of the plurality of blocks.

10. The modular electrolyzer system of claim 8, wherein the gas distribution module is disposed at a location peripheral to the plurality of blocks.

11. The modular electrolyzer system of claim 8, wherein the gas distribution module supplies the plurality of generator modules with hydrogen at startup.

12. The modular electrolyzer system of claim 8, wherein the gas distribution module is configured to detect at least one safety event, and stop supply of hydrogen in response to the safety event.

13. The modular electrolyzer system of claim 8, wherein the gas distribution module further includes at least one of a pressure detector, a gas safety shutoff, and a purge gas distributor.

14. The modular electrolyzer system of claim 8, wherein the gas distribution module includes a hydrogen outlet connection.

15. The modular electrolyzer system of claim 8, wherein the gas distribution module is configured to use internal and/or external steam.

16. The module electrolyzer system of claim 1, wherein the hydrogen collection component comprises piping within the servicing aisle that is configured to collect hydrogen product generated by the plurality of generator modules.

17. The module electrolyzer system of claim 16, wherein the piping is configured to prevent condensate backflow into the generator modules.

18. The module electrolyzer system of claim 16, wherein the hydrogen product flows through the piping to a downstream compression system.

19. The module electrolyzer system of claim 18, further comprising a gas distribution module configured to supply hydrogen to the plurality of generator modules, wherein the downstream compression system is configured to supply pressurized hydrogen to the gas distribution module.

20. The module electrolyzer of claim 1, wherein:
the system comprises a plurality of blocks;
each of the plurality of generator modules comprises electrolyzer cells; and
the servicing aisle and hydrogen collection component are located between the rows of modules in adjacent blocks of the plurality of blocks.

* * * * *